United States Patent
Shimmo et al.

(10) Patent No.: US 6,940,650 B2
(45) Date of Patent: Sep. 6, 2005

(54) DIFFRACTION OPTICAL ELEMENT AND TRANSFER MOLD THEREFOR

(75) Inventors: Katsuhide Shimmo, Osaka (JP); Kenichi Nakama, Osaka (JP); Yukinari Sekiguchi, Osaka (JP); Naoko Hikichi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/418,225

(22) Filed: Apr. 18, 2003

(65) Prior Publication Data

US 2003/0234982 A1 Dec. 25, 2003

(30) Foreign Application Priority Data

Apr. 19, 2002 (JP) .................................. P2002-117437
Jun. 21, 2002 (JP) .................................. P2002-180924

(51) Int. Cl.[7] ................................................ G02B 5/18
(52) U.S. Cl. ...................... 359/572; 359/569; 359/566; 359/576; 359/900
(58) Field of Search ................................ 359/572, 569, 359/566, 576, 571, 900

(56) References Cited

U.S. PATENT DOCUMENTS 6,608,722 B2 * 8/2003 Cowan et al. .............. 359/599
6,641,985 B2 * 11/2003 Unno et al. ................. 430/321
6,736,999 B2 * 5/2004 Nakabayashi ............... 264/1.1
2001/0050815 A1 * 12/2001 Ishihara et al. ............. 359/566
2003/0058538 A1 * 3/2003 Sugiyama et al. .......... 359/570
2003/0197941 A1 * 10/2003 Ohgane ...................... 359/558

OTHER PUBLICATIONS

U.S. Appl. No. 60/222,182.*

* cited by examiner

Primary Examiner—Fayez G. Assaf
(74) Attorney, Agent, or Firm—Whitham, Curtis & Christofferson, PC (57) ABSTRACT

A diffraction optical element including an element body having a large number of grooves formed on its surface to form a grating, and a grating shape adjusting layer deposited on a grating surface of the element body by oblique incidence or material particles onto the grating surface, wherein the grating shape adjusting layer per se is made of a reflecting film material. By the grating shape adjusting layer, the contour shape of the resulting grating surface in a section perpendicular to a lengthwise direction of the grooves is made not similar to the sectional shape of the element body. A reflecting film may be formed on a grating shape adjusting layer made of another material. A reflecting film may be provided on the element body before a grating shape adjusting layer made of a transparent dielectric material is provided on the reflecting film.

14 Claims, 8 Drawing Sheets

DIFFRACTION OPTICAL ELEMENT AND TRANSFER MOLD THEREFOR

The present application is based on Japanese Patent Applications Nos. 2002-117437 and 2002-180924, the entire contents of which are incorporated herein by reference.

BACKGROUND OF THE INVENTION

1. Field of the Invention

The present invention relates to a diffraction optical element or a transfer mold for such an optical element having a structure in which a orating shape adjusting layer is deposited on a grating surface constituted by a large number of grooves. Particularly, it relates to a diffraction optical element in Which an optical shape is changed so that a desired optical characteristic is exhibited by disposing a grating shape adjusting layer.

The invention can be also applied to a transfer mold for molding a diffraction optical element. A grating shape or the like of a molded product (a diffraction optical element or a replica molding tool) can be adjusted finely by forming a groove shape adjusting layer or by performing directional etching.

The diffraction optical element of the invention is particularly useful for a demultiplexing device or the like in wavelength division multiplexing optical communication.

2. Related Art

As known commonly, the diffraction optical element is an optical component using diffraction of light. As a typical example of the diffraction optical element, a large number of parallel grooves are formed on a surface at regular intervals to thereby form a diffraction optical element. For example, this type diffraction optical element is used as a demultiplexing device for taking out light having an optional wavelength from wavelength division multiplexed light in wavelength division multiplexing optical communication. There are various methods for producing such a diffraction optical element. A transfer molding method is one of the methods This is a method for producing a diffraction optical element by transferring a periodic groove structure of a transfer mold (original mold) Or a replica molding tool may be produced by transfer of a transfer mold (original mold) in advance so that a diffraction optical element is produced by retransfer of a periodic groove structure of the replica molding tool. In the case of a reflection type diffraction optical element, a reflecting film is formed on a grating surface of a molded product.

The periodic groove structure of a surface of the original mold is formed by an optional method such as a method of performing cutting by a ruling engine, a method of exposing a photo-curable resin applied on a substrate to coherent light and then dry-etching the substrate together with the resulting patterned resin, a method of dry-etching a glass substrate or a method of wet-etching a silicon substrate. For example, the density of the grooves formed is in a range of from several hundreds to a thousand and several hundreds per 1 mm. In the diffraction optical element produced by the transfer molding method, there is a certain limit to the shape of each groove because of a physical restriction on a producing method that mold release must be made. In addition, the depth of each groove is limited according to the shape of each groove but it is generally said that the limit in the depth of each groove is 400 nm to 600 nm.

The transfer molding method has an advantage in that it is excellent in mass production. On the other hand, when there is a shape failure found in the original mold after transfer molding, It is necessary to make the original mold again newly. There is a problem that a long time is required for making the original mold. The reason is that it is very difficult to correct the groove shape by an additional process such as cutting because the shape Lust be changed delicately.

Also in the case where a diffraction optical element having a desired optical characteristic slightly different from that of an existing diffraction optical element needs to be produced, it is necessary to make the original mold newly in accordance with the required optical characteristic. This is also because there has been no technique for performing an additional process on the basis of the original mold.

SUMMARY OF THE INVENTION

An object of the invention is to provide a diffraction optical element or a transfer mold for such a diffraction optical element in which a grating shape constituted by a large number of grooves can be easily corrected so that the resulting diffraction optical element exhibits a desired optical performance.

As for the diffraction optical element, the invention is directed to provide a diffraction optical element in which a required grating shape can be obtained by correction of the shape of an element body to thereby make it possible to exhibit desired optical performance. Also, the invention is directed to provide a diffraction optical element which can be changed into an optical shape or adjusted to have a desired optical characteristic. Another object of the invention is to provide a diffraction optical element having an optical characteristic independent of the state of polarization because diffraction efficiency in S polarization can be set to be substantially equal to diffraction efficiency in P polarization.

As for the transfer mold, the invention is directed to provide a transfer mold for molding a diffraction optical element, in which a molding surface having a desired shape can be obtained easily and in a short term by suitable correction of the shape of each groove even in the case where there is a shape failure in a mold body. Using the transfer mold of the invention, a molded product having desired optical performance can be obtained easily by suitably correcting of the shape of the grooves in the mold body.

The invention provides a diffraction optical element including an element body having a large number of grooves formed on its surface at regular intervals to form a grating, and a grating shape adjusting layer deposited on a grating surface of the element body by oblique incidence of material particles onto the grating surface, wherein: the grating shape adjusting layer per se is made of a reflecting film material; and the contour shape of the resulting grating surface in a section perpendicular to a lengthwise direction of the grooves is not similar to the sectional shape of the element body.

The invention also provides a diffraction optical element including an element body having a large number of grooves formed on its surface at regular intervals to form a grating, a grating shape adjusting layer deposited on a grating surface of the element body by oblique incidence of material particles onto the grating surface, and a reflecting film formed on the grating shape adjusting layer, wherein the contour shape of the resulting grating surface in a section perpendicular to a lengthwise direction of the grooves is not similar to the sectional shape of the element body.

By these configurations, each groove can be deepened or the groove shape can be controlled. Accordingly, even in the case where there is a shape failure found in an original mold, it is possible to correct the original mold relatively easily and perform fine adjustment of the optical performance or the like. When material particles are made incident onto the grating surface of the element body obliquely from both sides so that the material particles are deposited as a grating shape adjusting layer on the grating surface, shape control can be made so that each groove is deepened more than that in the case where material particles are made incident onto the grating surface obliquely from one side. Preferably, the deposition of the material particles may be performed by a vapor deposition method so that directional property can be controlled more greatly.

The invention further provides a diffraction optical element including an element body having a large number of grooves formed on its surface at regular intervals to form a grating, a reflecting film formed on a grating surface of the element body, and a grating shape adjusting layer deposited on the reflecting film by oblique incidence of material particles onto the reflecting film, wherein: the grating shape adjusting layer is made of a transparent dielectric material; and the contour shape of the resulting grating surface in a section perpendicular to a lengthwise direction of the grooves is not similar to the sectional shape of the element body.

The invention further provides a diffraction optical element including an element body having a large number of grooves formed on its surface at regular intervals to form a grating, a reflecting film formed on a grating surface of the element body, a grating shape adjusting layer deposited on the reflecting film by oblique incidence of material particles onto the reflecting film, and a transparent dielectric layer provided on the grating shape adjusting layer, wherein the contour shape of the resulting grating surface in a section perpendicular to a lengthwise direction of the grooves is not similar to the sectional shape of the element body.

The invention further provides a diffraction optical element including an element body having a large number of grooves formed on its surface at regular intervals to form a grating, a grating shape adjusting layer deposited on a grating surface of the element body by oblique incidence of material particles onto the grating surface, a reflecting film formed on the grating shape adjusting layer, and a transparent dielectric layer provided on the reflecting film, wherein the contour shape of the resulting grating surface in a section perpendicular to a lengthwise direction of the grooves is not similar to the sectional shape of the element body.

By these configurations, the optical shape can be changed or the optical characteristic can be adjusted to a desired value. Accordingly, an existing element body can be used for producing a diffraction optical element having a desired optical characteristic (such as polarizing characteristic or reflectance). Preferably, the transparent dielectric layer is made of a material high in refractive index. To adjust diffraction efficiency so that diffraction efficiency in S polarization is substantially equal to diffraction efficiency in P polarization, the thickness of the transparent dielectric layer may be preferably selected to be about ¼ as large as the wavelength used. In this case, a material high in refractive index may be preferably used as the transparent dielectric.

Incidentally, in some of the configurations in which a reflecting layer is provided as a layer separate from the grating shape adjusting layer, the reflecting film in generally formed so as to be thin and uniform in thickness but may be formed so as to be uneven in thickness. The term "uneven in thickness" means the case where a peak portion of each convex portion in the contour shape of the grating surface in a section perpendicular to a lengthwise direction of each groove is thicker than the other portion, the case where a single side of each groove in the contour shape is thicker than the other portion, and so on.

For example, a structure in which a sol-gel glass composition having a large number of grooves formed on its surface by transfer molding is provided so as to be integrated with the glass substrate may be preferably used as the element body because the structure is more excellent in heat resistance than a resin or the like.

Further, the invention provides a transfer mold for molding a diffraction optical element, including a mold body having a large number of grooves formed or its surface at regular intervals, and a groove shape adjusting layer deposited on a mold surface of the mold body by incidence of material particles onto the mold surface, wherein the groove shape adjusting layer per se is made of a mold-release film material and the contour shape of the resulting molding surface in a section perpendicular to a lengthwise direction of the grooves is not similar to the sectional shape of the mold body.

The invention also provides a transfer mold for molding a diffraction optical element, including a mold body having a large number of grooves formed on its surface at regular intervals, a groove shape adjusting layer deposited on a mold surface of the mold body by incidence of material particles onto the mold surface, and a mold-release film formed on the groove shape adjusting layer, wherein the contour shape of the resulting molding surface in a section perpendicular to a lengthwise direction of the grooves is not similar to the sectional shape or the mold body.

The invention further provides a transfer mold for molding a diffraction optical element, including a mold body having a large number of grooves formed on its surface at regular intervals and having an additionally processed surface formed by directional etching of a mold surface of the mold body, and a mold-release film formed on the additionally processed surface, wherein the contour shape of the resulting molding surface in a section perpendicular to a lengthwise direction oft he grooves is corrected to be not similar to the original sectional shape of the mold body.

When the groove shape adjusting layer is deposited or an additional process is performed by directional etching in the aforementioned manner, each groove can be deepened or the groove shape can be controlled. Accordingly, even in the case where shape failure is found in the mold body, the optical performance of a molded product can be adjusted finely as well as the groove shape can be corrected relatively easily. Furthermore, because the optical shape can be changed or the optical characteristic can be adjusted to a desired value, an existing mold body can be used for producing a diffraction optical element having desired optical characteristic. Preferably, in the invention, the groove shape adjusting layer is deposited on a mold surface of the mold body by oblique incidence of material particles on to the mold surface. In this case, incidence of material may be performed from only a single side. However, when incidence of material is performed from opposite sides, shape control can be made so that each groove is deepened more compared with the case of incidence of material from a single side. In the case of an additional process, directional etching is preferably performed by oblique ion beam irradiation.

Incidentally, in some of the configurations in which the mold-release film is provided separately, the mold-release film is generally formed so as to be thin and uniform in thickness but may be formed so as to be uneven in thickness. The term "uneven in thickness" means the case where a peak portion of each convex portion in the contour shape of the mold surface in a section perpendicular to a lengthwise direction of each groove is thicker than the other portion, the case where a single side or each groove in the contour shape is thicker than the other portion, and so on. A precious metal such as Au or Pt is preferably used as the mold-release film material

DETAILED DESCRIPTION OF THE PREFERRED EMBODIMENTS (First Embodiment)

Figure 4A:
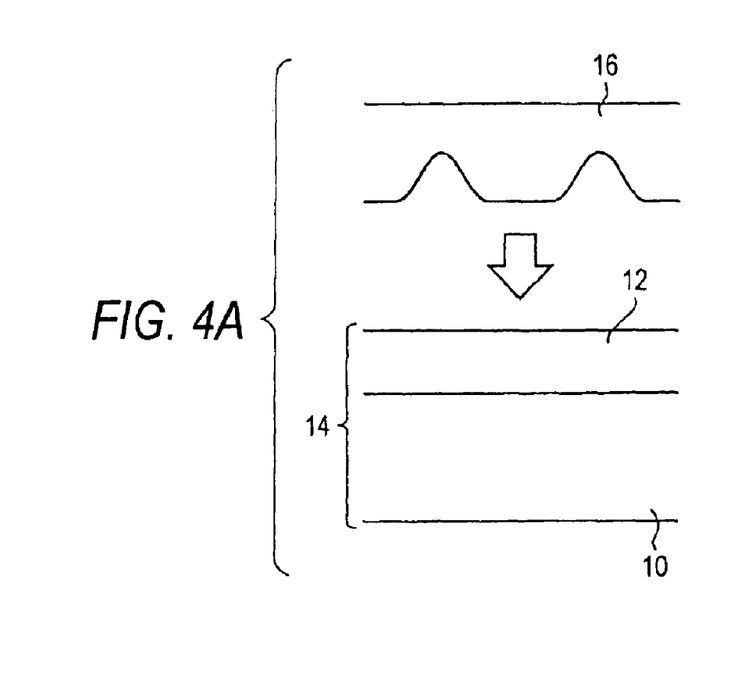
FIGS. 4A and 4B are views for explaining a method for producing an element body.

A grating composed of a large number of grooves on a surface of an element body is typically formed by a transfer molding method using a sol-gel material. For example, the transfer molding method may be a method the same as disclosed in JP-A-2001-9843. Brief description will be made with reference to FIGS. 4A and 4B. As shown in FIG. 4A, first, a sol-gel glass material 12 having a predetermined thickness is applied on a surface of a glass substrate 10 to prepare a base plate 14. On the other hand, an original mold 16 (molding tool) having a large number of parallel grooves formed at regular intervals in its molding surface (facing the base plate) is prepared. As described preliminarily, the original mold 16 may be produced by an optional method using an optional material. For example, the original mold 16 may be produced by dry-etching of a glass substrate, wet-etching or a silicon substrate, or molding of a substrate made of a resin such as epoxy. The sectional shape of each groove in the original told is also optional. The sectional shape of each groove may be a sine wave shape, a combination shape having a convex portion having a flat peak portion and a concave portion (bottom) shaped like a sine curve or a V figure, or a triangular wave shape. Incidentally, because the shape needs to be a mold-releasable shape, the depth of each groove is selected to be not larger than about 600 nm, preferably not larger than about 400 nm. The density of the grooves formed is selected to be in a range of from several hundreds to a thousand and several hundreds per 1 mm (e.g., 900/mm) from the point of view of required optical characteristic.

Figure 4B:
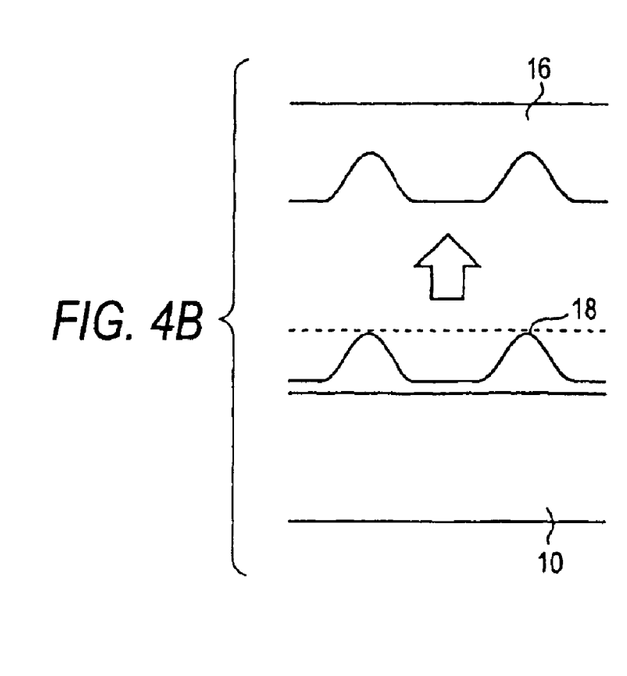

While the original mold 16 is pressed for a predetermined time against the sol-gel glass material (gel film) 12 in a press molding apparatus kept in a vacuum, the sol-gel glass material (gel film) 12 is heated so as to be hardened Then, the internal pressure of the press molding apparatus is returned to atmospheric pressure and the original mold 16 is released from the sol-gel glass material 12 (see FIG. 4B). As a result, the groove shape of the original mold 16 is transferred to the sol-gel glass material 12. Then, the sol-gel glass material 12 is heated and condensation-polymerized to form a sol-gel glass composition integrated with the glass substrate 10. In this manner, an element body having a grating formed into a desired groove shape is obtained.

In the invention, a grating shape adjusting layer is deposited, by oblique incidence of material particles, on the grating surface of the element body having a large number of grooves formed in such a surface at regular intervals to form a grating. For example, an shown in FIG. 11, oblique vapor deposition is performed at a certain film-forming angle inclined to the grating surface 22 of the element body 20. Film formation may be also performed in the condition that the element body is inclined to a sputter target. Film formation may be performed on the grating surface from opposite sides or from only a single side.

Figure 1A:
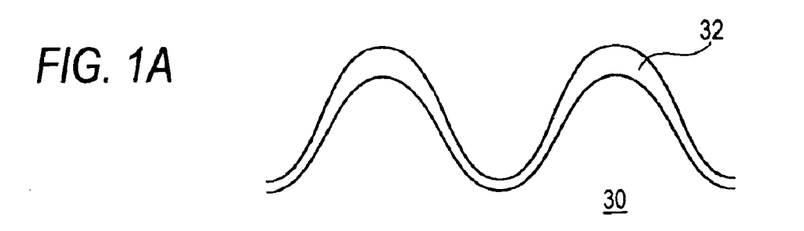
FIGS. 1A to 1C are enlarged explanatory views showing examples of a diffraction optical element according to the invention.
Figure 1B:
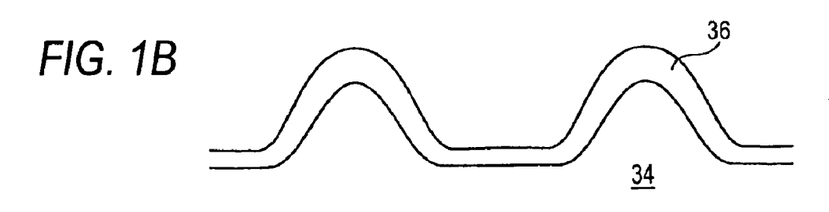
Figure 1C:
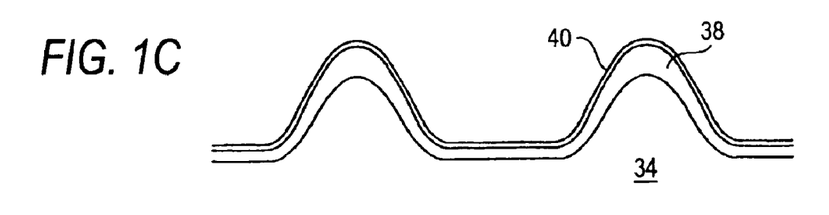

FIGS. 1A to 1C are enlarged explanatory views showing examples of the diffraction optical element according to the invention. FIG. 1A shows an example in which the groove shape (the shape of a section perpendicular to a lengthwise direction of the grooves) of the element body 30 is a sine wave shape and in which the grating shape adjusting layer 32 is deposited on the grating surface of the element body 30 by oblique incidence of reflecting film material particles onto the grating surface from opposite sides. FIG. 1B shows an example in which the groove shape of the element body 34 is a combination shape having a sine wave-shaped convex portion arid a flat concave portion (bottom) and in which the grating shape adjusting layer 36 is deposited on the grating surface of the element body 34 by oblique incidence of reflecting film material particles onto the grating surface from opposite sides. Accordingly, in each of the examples, the grating shape adjusting layer 32 or 36 exhibits bilateral symmetry and the grating shape adjusting layer per se forms a reflecting film. FIG. 1C shows an example in which the groove shape of the element body 34 is a combination shape having a sine wave-shaped convex portion and a flat concave portion (bottom) and in which after the grating shape adjusting layer 38 is deposited on the grating surface of the element body 34 by oblique incidence of material particles onto the grating surface from opposite sides, a reflecting film 40 provided separately is formed on the grating shape adjusting layer 38. In this case, a low reflectance material or a non-reflective material can be used as the grating shape adjusting layer 38. In any one of the examples shown in FIGS. 1A to 1C, the contour shape of the resulting grating surface in a section perpendicular to the lengthwise direction of the grooves is not similar to the sectional shape of the element body. Accordingly, the contour shape of the resulting grating surface can be corrected to deepen each groove.

Figure 2A:
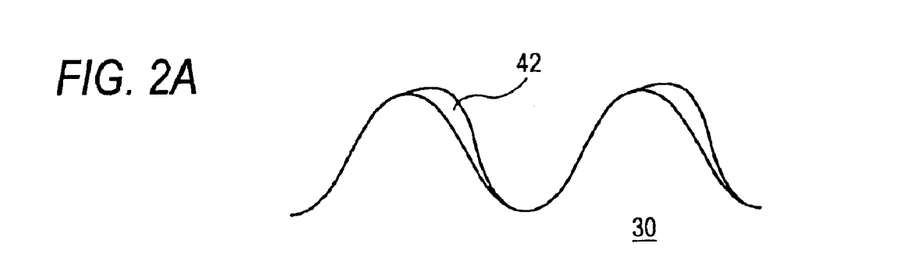
FIGS. 2A to 2C are enlarged explanatory views showing other examples of the diffraction optical element according to the invention.
Figure 2B:
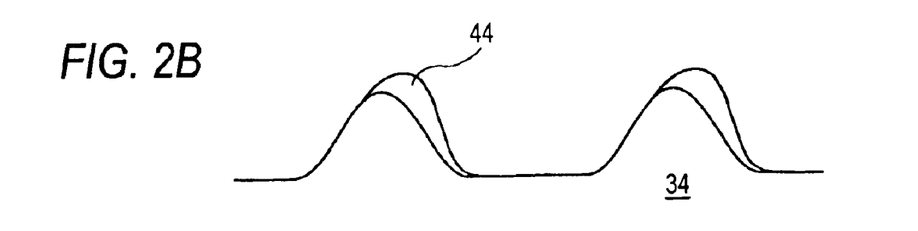
Figure 2C:
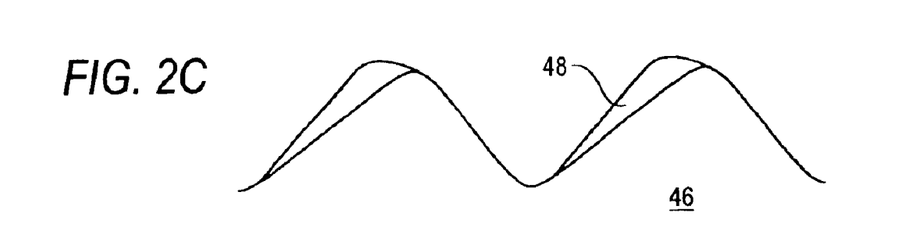

Next, FIGS. 2A to 2C are enlarged explanatory views showing other examples of the diffraction optical element according to the invention. FIG. 2A shows an example in which the groove shape of the element body 30 is a sine wave shape and in which the grating shape adjusting layer 42 is deposited on the grating surface of the element body 30 by oblique incidence of material particles onto the grating surface from a single side. FIG. 2B shows an example in which the groove shape of the element body 34 is a combination shape having a sine wave-shaped convex portion and a flat concave portion (bottom) and in which the grating shape adjusting layer 44 is deposited on the grating surface of the element body 34 by oblique incidence of material particles onto the grating surface from a single side. FIG. 2C shows an example in which the groove shape of the element body 46 is a triangular wave shape bilaterally asymmetrical and in which the grating shape adjusting layer 48 is deposited on the grating surface of the element body 46 by oblique incidence of material particles onto the grating surface from a single side. The grating shape adjusting layer per se may be made of a reflecting film material, or a reflecting film uniform in thickness may be formed on the element body before the grating shape adjusting layer made of a reflecting film material is formed on the reflecting film. Alternatively, a reflecting film may be formed on the grating shape adjusting layer. In any one of the examples shown in FIGS. 2A to 2C, the contour shape of the resulting grating surface in a section perpendicular to the lengthwise direction of the grooves is not similar to the sectional shape of the element body. Accordingly, the groove shape per se can be deformed. A required shape can be obtained easily, so that required optical performance can be exhibited.

Figure 3A:
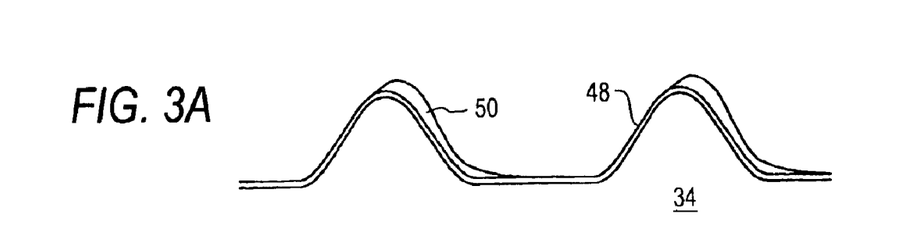
FIGS. 3A and 3B are enlarged explanatory views showing further examples of the diffraction optical element according to the invention.
Figure 3B:
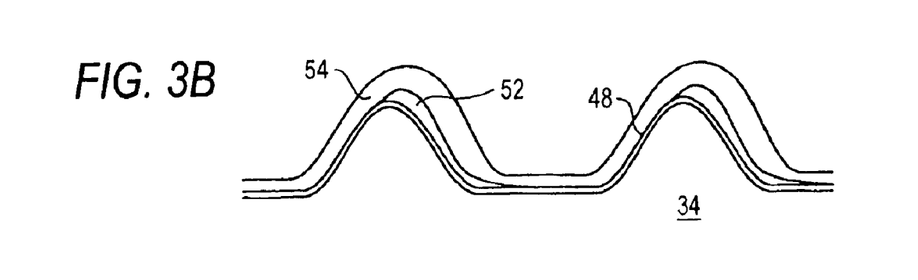

FIGS. 3A and 3B are enlarged explanatory views showing further examples of the diffraction optical element according to the invention. In FIG. 3A, the groove shape of the element body 34 is a combination shape having a sine wave-shaped convex portion and a flat concave portion (bottom), and a reflecting film 48 uniform in thickness is formed on the grating surface of the element body 34. A grating shape adjusting layer 50 is deposited on the reflecting film 48 by oblique incidence of material particles onto the reflecting film 48 from a single side. The grating shape adjusting layer 50 is made of a transparent dielectric material. Also in FIG. 3B, the groove shape of the element body 34 is a combination shape having a sine wave-shaped convex portion and a flat concave portion (bottom), and a reflecting film 48 uniform in thickness is formed on the grating surface of the element body 34. A grating shape adjusting layer 52 is deposited on the reflecting film 48 by oblique incidence of material particles onto the reflecting film 48 from a single side. In this case, the grating shape adjusting layer 52 is made of a reflecting film material. The grating shape adjusting layer 52 may be made of a transparent dielectric material. A transparent dielectric layer 54 is formed on the grating shape adjusting layer 52. In these configurations, it is possible to change the optical shape or adjust the optical characteristic to desired characteristic. When the thickness of the transparent dielectric layer 54 is selected to be about ¼ as large as the wavelength used, diffraction efficiency in S polarization can be made substantially equal to diffraction efficiency in P polarization. Accordingly, optical characteristic independent of the state of polarization can be exhibited.

Although FIG. 3B shows the case where a reflecting film uniform in thickness is formed on the grating surface before a grating shape adjusting layer is deposited on the reflecting film by oblique incidence or material particles onto the reflecting film from a single side, the invention may be also applied to the case where a grating shape adjusting layer is deposited on the grating surface by oblique incidence of material particles onto the grating surface from a single side before a reflecting film uniform in thickness is formed on the grating shape adjusting layer. Even in the case where the film-forming sequence of the reflecting film and the grating shape adjusting layer is inverted, the same optical characteristic as described above can be obtained because the same shape as shown in FIG. 3B can be obtained consequently if the grating shape adjusting layer is made of a reflecting film material.

The material of the substrate is not particularly limited For example, the material of the substrate may be a dielectric material, a metal material or a semiconductor material. With respect to the optical characteristic of the substrate, the substrate maybe transparent to light or may be opaque to light. A shape which can be subjected to transfer molding is preferably used as the shape of the grating. The sectional shape of the grating surface may be a sine wave shape or an asymmetric shape. Incidentally, it is difficult or impossible to apply transfer molding to a shape such as a rectangular shape formed so that a side surface of each groove is perpendicular to or inclined at an angle of 90 degrees or higher to the substrate. Accordingly, a shape inclined at an angle lower than 90 degrees, such as a shape including a sine wave or a triangular wave shape, can be used preferably.

In the element body having a large number of grooves formed on its surface at regular intervals to form a grating, convex portions of the grating may be formed discontinuously or continuously. Incidentally, because the transfer molding method in inexpensive and suitable for mass production, the continuous shape of the convex portions is preferred to the independent shape of the convex portions. The material for forming the grating surface is not particularly limited either. Any material such as a dielectric material, a metal material, a semiconductor material or a resin material may be used as the material for forming the grating surface. In consideration of a more inexpensive production process, a resin or sol-gel material which is a transfer-moldable material may be used preferably. The whole grating surface need not be covered with the grating shape adjusting layer formed on the grating surface. The grating shape adjusting layer may be provided in a state in which the grating shape adjusting layer is not formed on part of the grating surface. This state can be preferably used in the case where the shaping condition due to the film needs to be emphasized more strongly.

(Second Embodiment)

Figure 8A:
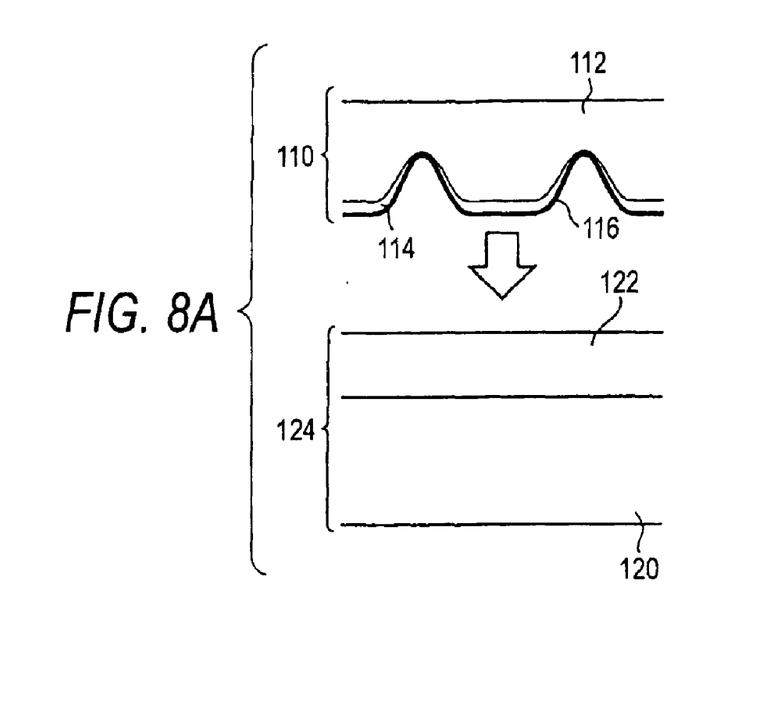
FIGS. 8A and 8B are views for explaining an example of a transfer molding method.
Figure 8B:
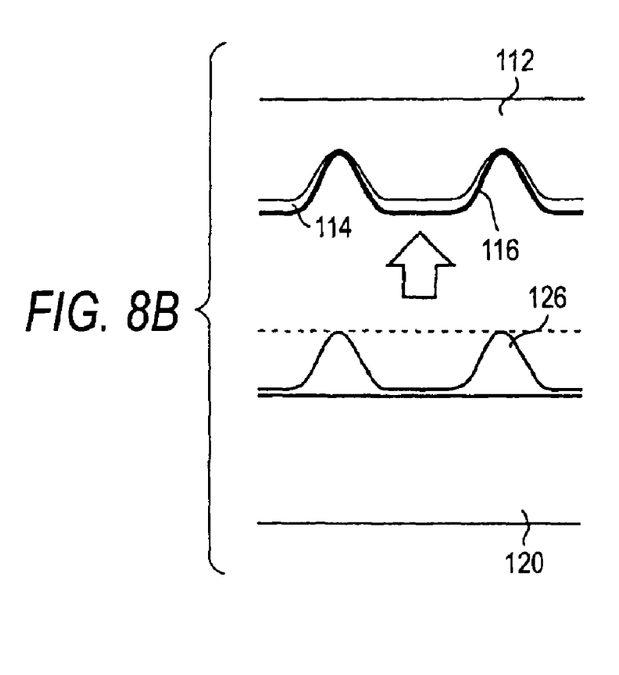

A transfer mold for molding a diffraction optical element according to the invention is typically used for transfer-molding a diffraction optical element from a sol-gel material. The transfer molding method will be described in brief with reference to FIGS. 8A and 8B. As shown in FIG. 8A, first, a transfer mold 110 (original mold) having a large number of parallel grooves formed in its mold surface (facing the base plate) at regular intervals is prepared. In the invention, the transfer mold 110 has a structure including a mold body 112 having a large number of grooves formed on its surface at regular intervals, a groove shape adjusting layer 114 deposited on a mold surface of the mold body 112 by oblique incidence of material particles onto the mold surface, and a mold-release film 116 provided on the groove shape adjusting layer 114. The mold body 112 may be produced by an optional method using an optional materials For example, the mold body 112 may be produced by dry-etching of a glass substrate, wet-etching of a silicon substrate, or molding of a substrate made of a resin such as epoxy. The groove shape of the mold body 112 is optional.

The groove shape of the mold body 112 may be a sine wave shape, a shape having a flat groove peak portion, or a triangular wave shape.

Figure 9A:
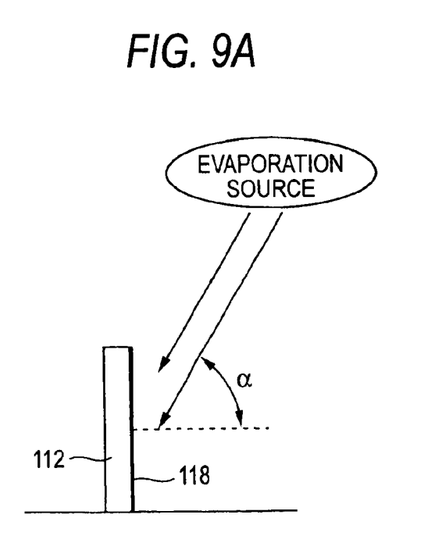
FIGS. 9A and 9B are views for explaining oblique vapor deposition.
Figure 9B:
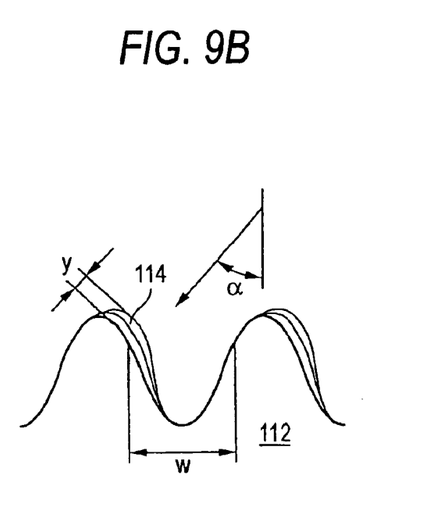

For example, as shown in FIG. 9A, particles are obliquely vapor-deposited on the mold surface 118 of the mold body 112 at a certain incident angle α of material particles from an evaporation source. Film formation may be performed in the condition that the mold body is inclined to a sputter target. Film formation may be performed on the mold surface 118 from opposite sides or from a single side. Incidentally, if a thick film is formed in the condition that the incident angle of material particles is large while each groove is deep, the side surface of the groove is first filled. Because the transfer mold needs to have a mold-releasable shape, the relation between the groove shape and the film-forming angle must be set so that the angle of inclination of the side wall of the groove to the bottom of the groove is larger than 90°. As shown In FIG. 9B, it is necessary to satisfy the relation: w>y·sin α in which w is the trough width of each groove, α is the angle of inclination of the film-forming direction to the mold surface, and y is the thickness of the film to be formed. After the groove shape of the mold body, the thickness of the film to be formed and the film-forming direction are decided to satisfy the relation, the groove shape adjusting layer is deposited. Incidentally, the groove depth is selected to be not larger than about 600 nm, preferably not larger than about 400 nm, from limitation in mold release, The density of grooves to be formed is selected to be in a range of from the order of several hundreds to the order of a thousand and several hundreds per 1 mm (e.g., 900/mm) in terms of required optical characteristic.

On the other hand, a sol-gel glass material 122 having a predetermined thickness is applied on a surface of a glass substrate 120 to prepare a base plate 124. While the transfer mold 110 is pressed for a predetermined time against the sol-gel glass material (gel film) 122 in a press molding apparatus kept in a vacuum, the base plate 124 is heated so that the gel film 122 is hardened. Then, the internal pressure of the press molding apparatus is returned to atmospheric pressure, the transfer mold 110 is released from the sol-gel glass material 122 (see FIG. 8B). As a result, the groove shape of the transfer mold 110 is transferred to the sol-gel glass material 122. Then, the sol-gel glass material 122 is heated and condensation-polymerized to form a sol-gel glass composition 126 integrated with the glass substrate 120. In this manner, a diffraction optical element having a desired diffraction grating is obtained.

Figure 5A:
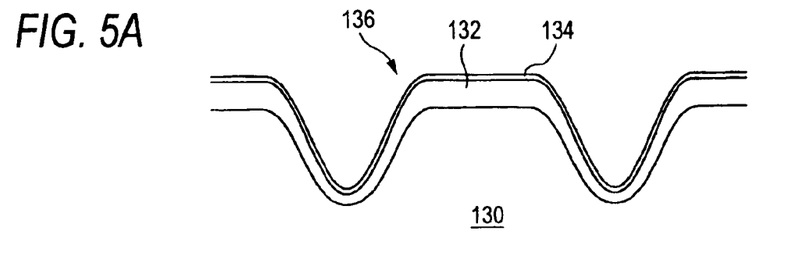
FIGS. 5A and 5B are explanatory views showing an example of a transfer mold according to the invention and a molded product produced by use of the transfer mold.
Figure 5B:
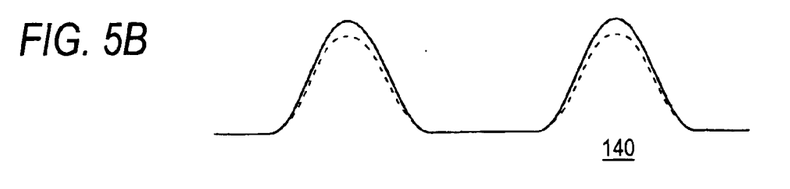

FIGS. 5A and 5D are explanatory views showing an example of the invention FIG. 5A is a partly enlarged view showing a transfer mold for molding a diffraction optical element according to the invention. FIG. 5B is a partly enlarged view showing a diffraction optical element transfer-molded by use of the transfer mold. As shown in FIG. 5A, the groove shape (the shape of a section perpendicular to the lengthwise direction of each groove) of the mold body 130 is composed of flat convex portions and sine wave-shaped concave portions. A groove shape adjusting layer 132 is deposited on the whole mold surface of the mold body 130 by incidence of material particles onto the whole mold surface. A mold-release film 134 is provided an the groove shape adjusting layer 132. In this manner, a transfer mold 136 is produced. The groove shape adjusting layer 132 exhibits bilateral symmetry. FIG. 5B shows a molded product (such as a diffraction optical element) 140 having the groove shape transferred from the transfer mold 136. The groove shape of the molded product 140 in the grating surface is reversed to the groove shape of the transfer mold, that is, the groove shape or the molded product 140 is composed of sine wave-shaped convex portions and flat concave portions (bottoms). Incidentally, the broken line in FIG. 5B shows the shape of a transfer-molded product in the case where the mold body is used in the condition that the groove shape adjusting layer has not been deposited on the mold body yet.

Figure 6A:
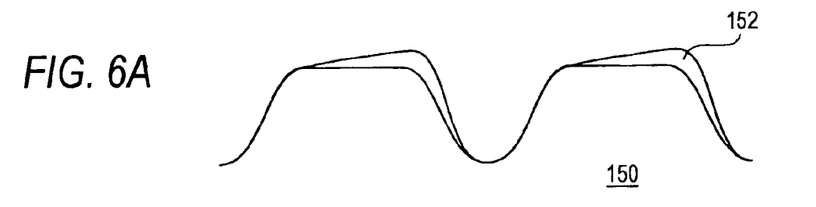
FIGS. 6A and 6B are enlarged explanatory views showing other examples of the transfer mold according to the invention.
Figure 6B:
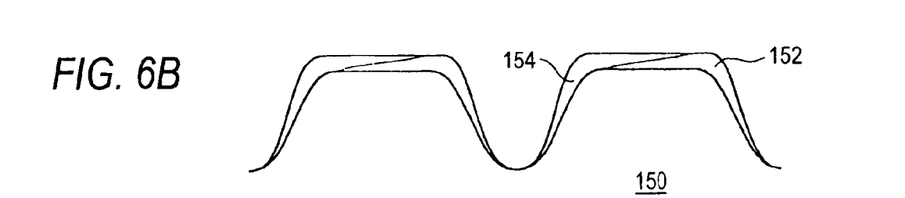

FIGS. 6A and 6B are enlarged explanatory views showing other examples of the transfer mold for molding a diffraction optical element according to the invention. In the example shown in FIG. 6A, the groove shape (the shape of a section perpendicular to the lengthwise direction of each groove) of the mold body 150 is composed of flat convex portions and sine wave-shaped concave portions. A groove shape adjusting layer 152 is deposited on the mold surface of the mold body 150 by incidence of material particles onto the mold surface from a single side. Accordingly, the groove shape adjusting layer 152 exhibits bilateral asymmetry. In the example shown in FIG. 6B, the groove shape (the shape of a section perpendicular to the lengthwise direction of each groove) of the mold body 150 is composed of flat convex portions and sine wave-shaped concave portions, like the example shown in FIG. 6A. In FIG. 6B, a first groove shape adjusting layer 152 is deposited on the mold surface of the mold body 150 by incidence of material particles onto the mold surface from a single side. A second groove shape adjusting layer 154 is further deposited on the mold surface of the mold body 150 by incidence of material particles onto the mold surface from the other side. In this configuration, the resulting shape including the two groove shape adjusting layers 152 and 154 exhibits bilateral symmetry. If each of these groove shape adjusting layers 152 and 154 is made of a mold-release film material, it is unnecessary to provide any special mold-release film particularly as the uppermost portion separately.

FIGS. 7A to 7D are enlarged explanatory views showing further examples of the transfer mold for molding a diffraction optical element according to the invention. In the example shown in FIG. 7A, the groove shape of the mold body 160 is a sine wave shape. A groove shape adjusting layer 162 is deposited on the mold surface of the mold body 160 by oblique incidence of material particles onto the mold surface from opposite sides. Accordingly, the sectional shape of each groove exhibits bilateral symmetry. In the example shown in FIG. 7B, the groove shape of the mold body 160 is a sine wave shape. A groove shape adjusting layer 164 is deposited on the mold surface of the mold body 160 by oblique incidence of material particles onto the mold surface from a single side. In this case, the sectional shape of each groove exhibits bilateral asymmetry. In the example shown in FIG. 7C, the groove shape of the mold body 170 is a triangular wave shape. A groove shape adjusting layer 172 is deposited on the mold surface of the mold body 170 by oblique incidence of material particles onto the mold surface from opposite sides. In the example shown in FIG. 7D, the groove shape of the mold body 170 is a triangular wave shape. A groove shape adjusting layer 174 is deposited on the mold surface of the mold body 170 by oblique incidence of material particles onto the mold surface from a single side. The groove shape adjusting layer per se may be made of a mold-release film material or a mold-release film maybe formed on the groove shape adjusting layer. In any one of the examples shown in FIGS. 7A to 7D, the contour shape of the resulting molding surface in a section perpendicular to the lengthwise direction of the grooves can be changed, so that a required groove shape can be obtained easily. When the transfer mold is used, required optical performance can be given to the diffraction optical element as a transfer-molded product.

Figure 10:
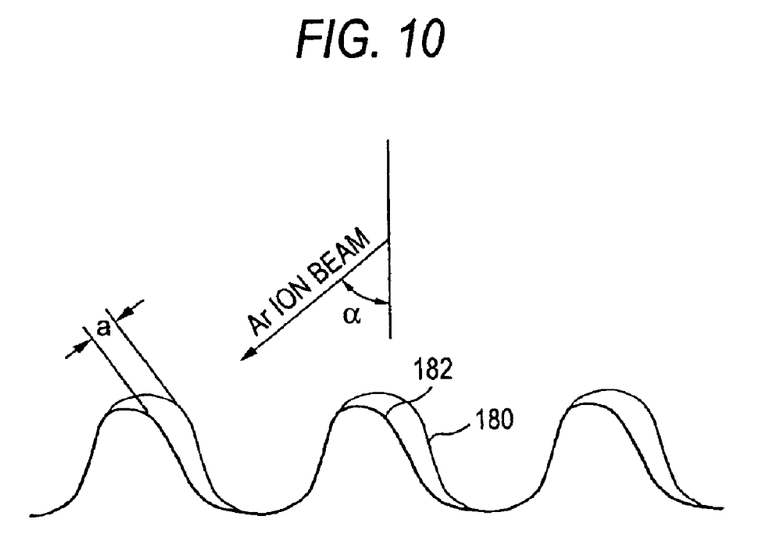
FIG. 10 is a view for explaining directional etching.

FIG. 10 shows another example of the method for producing a transfer mold for molding a diffraction optical element according to the invention. A mold surface of a mold body 180 having a large number of grooves formed on its surface at regular intervals is obliquely irradiated with an ion beam to perform directional etching to thereby form an additionally processed surface 182. In this example, the mold body 180 is irradiated with an Ar ion beam from an oblique direction (at an angle a with respect to the direction perpendicular to the mold surface) while Ar gas is imported into an ion beam etching apparatus. As a result, a part (maximum thickness: a) of the mold body 180 is removed. Then, a mold-release film is formed on the additionally processed surface 182 of the mold body 180 to produce a transfer mold for molding a diffraction optical element. In the thus produced transfer mold for molding a diffraction optical element, the contour shape of the resulting molding surface of the transfer mold in a section perpendicular to the lengthwise direction of the grooves is corrected to a desired shape which is not similar to the original sectional shape of the mold body. In the example shown in FIG. 10, the troughs of the transfer mold are corrected to be flattened by additional processing, so that the peaks of the molded product are changed to be flattened.

The material of the mold body is not particularly limited. Any material such as a dielectric material, a metal material or a semiconductor material may be used as the material of the mold body. The sectional shape of the mold surface may be a sine wave shape or an asymmetric shape. Incidentally, it is difficult or impossible to apply transfer molding to a shape such as a rectangular shape formed so that a side surface of each groove is perpendicular to or inclined at an angle of 90 degrees or higher to the mold surface. Accordingly, a shape inclined at an angle lower than 90 degrees, such as a shape including a sine wave or a triangular wave shape, can be used preferably.

In the mold body having a large number of grooves formed on its surface at regular intervals, convex portions of the mold surface may be formed discontinuously or continuously. Incidentally, because the transfer molding method is inexpensive and suitable for mass production, the continuous shape of the convex portions is preferred to the independent shape of the convex portions. The groove shape adjusting layer formed on the mold surface need not cover the whole mold surface. The groove shape adjusting layer may be provided in a state in which the groove shape adjusting layer is not formed on part of the mold surface This state can he preferably used in the case where the shaping condition due to the film needs to be emphasized more strongly.

Incidentally, the concept "diffraction optical element" used in the invention includes an optical component assembled with a diffraction grating as well as a simple diffraction grating used generally.

Further, the molded product transfer-molded from the transfer mold according to the invention is a diffraction optical element (including an optical component assembled with a diffraction grating as well as a single diffraction grating generally used) or a replica transfer mold for transfer-molding a diffraction optical element.

EXAMPLES

Example 1

Figure 11:
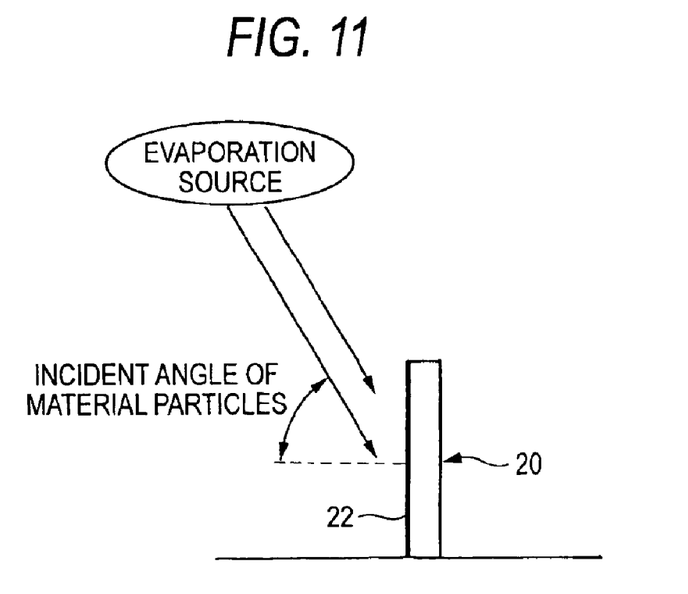
FIG. 11 is a view for explaining oblique vapor deposition.

A release film of Al/Cr/Pt/Au was formed on a grating surface of an original mold made of an epoxy resin. A sol liquid containing an aqueous solution of methyltriethoxysilane and acid as a main component was applied on a glass substrate to thereby obtain a gel film. The original mold was pressed against the gel film in a vacuum in the condition that the gel film was soft yet. Then, the gel film was kept at about 60° C. so as to be hardened. Then, the original mold was released from the gel film in the condition that the internal pressure of a press molding apparatus was returned to atmospheric pressure. Then, the gel film was heated to produce an element body. An Au film uniform in thickness was perpendicularly formed as a reflecting film on the element body. The optical characteristic of the thus obtained element was evaluated. Then, an Au film was formed thereon by oblique vapor deposition. As shown in FIG. 11, the incident angle of material particles was an angle between the normal line of the grating surface and the direction of incidence of the material. While the incident angle was changed to 85°, 65° and 45°, the film was formed from a single-side so that the film became 100 nm thick. Incidentally, the incident angle of material particles was controlled by the position viewed from an evaporation source. The obtained diffraction optical element had a structure as shown in FIG. 2B. The grating shape adjusting layer was made of Au which was a reflecting film material.

The optical characteristics of seven kinds of samples different in grating shape were evaluated. Results of the evaluation are shown in Table 1. In Table 1, the column "before film formation" means "before oblique vapor deposition". That is, results of evaluation in the condition that only the first reflecting film uniform in thickness has been already formed are shown in this column.

TABLE 1

| Sample | Incident angle of material particles | S polarization diffraction efficiency (%) | | | P polarization diffraction efficiency (%) | | |
|---|---|---|---|---|---|---|---|
| | | Before film formation | After film formation | Quantity of change | Before film formation | After film formation | Quantity of change |
| 1-1 | 85° | 31.7 | 49.8 | 18.1 | 14.0 | 21.3 | 7.4 |
| 1-2 | 85° | 50.4 | 53.8 | 3.4 | 25.7 | 28.8 | 3.1 |
| 1-3 | 65° | 46.2 | 67.6 | 21.4 | 25.4 | 30.6 | 5.2 |
| 1-4 | 65° | 56.0 | 76.7 | 20.7 | 34.4 | 38.6 | 4.2 |
| 1-5 | 65° | 49.0 | 68.3 | 19.3 | 24.5 | 29.9 | 5.4 |
| 1-6 | 45° | 61.7 | 67.7 | 6.0 | 37.6 | 37.1 | −0.5 |
| 1-7 | 45° | 42.9 | 47.4 | 4.5 | 24.7 | 25.5 | 0.8 |

It is obvious from these results that when a grating shape adjusting layer (Au) is formed on the uniform reflecting film by oblique vapor deposition, the grating shape can be changed to control both diffraction efficiency and polarizing characteristic. The incident angle of material particles may be preferably selected to be about 65° in order to increase the change of the grating shape. On the other hand, when the incident angle of material particles is 45°, the change of the shape is so small that variation in efficiency is narrow. It is obvious from this fact that the incident angle of 45° can be inversely used for fine adjustment.

Example 2

An element body produced in the same manner as in Example 1 was set so that the element body was inclined at a certain angle to a sputter target. First, a Cr film 30 nm thick was formed on the element body from a single side. Then, a Cr film 30 nm thick was formed on the element body from the opposite side in the condition that the element body was inclined at the same angle in the opposite direction. Those Cr film, were regarded as a grating shape adjusting layer. Incidentally, two finds of angles, 30° and 60°, were used as the incident angle of material particles. An Au film 50 nm thick was formed as a reflecting film on the grating shape adjusting layer perpendicularly. Each of the diffraction optical element samples produced thus had a structure as shown in FIG. 1C The optical characteristic of each of the diffraction optical element samples was measured and then the sectional shape of each sample was evaluated by an SEM (scanning electron microscope). Results of the evaluation were shown in Table 2.

TABLE 2

| Sample | Incident angle of material particles | S polarization diffraction efficiency (%) | P polarization diffraction efficiency (%) | Groove depth ($\mu$m) |
| --- | --- | --- | --- | --- |
| 2-1 | 60° | 44 | 18 | 0.29 |
| 2-2 | 30° | 57 | 32 | 0.32 |

When the grating shape adjusting layer was formed while the incident angle of material particles was changed, diffraction efficiency could be changed according to the state of polarization. Particularly when the incident angle of material particles was set to be 30°, diffraction efficiency could be increased both in S polarization and in P polarization. As is obvious from SEM evaluation, this is based on the fact that the groove depth and groove shape are controlled according to the incident angle of material particles. In this manner, it is obvious that optical characteristic can be controlled by the grating shape adjusting layer. It is also obvious that the groove shape can be corrected so that the groove depth becomes larger in the case where the grating shape adjusting layer is formed obliquely from opposite sides compared with the case where the grating shape adjusting layer is formed obliquely from a single side.

Example 3

In the condition that an element body produced in the same manner as in Example 1 was inclined at 45° to an evaporation source, a grating shape adjusting layer was formed on the element body. As the film configuration of the grating shape adjusting layer, two cases were used. That is, the case where an Al/SiO$_2$ film having a thickness of 100/280 nm was formed and the case where an Al/SiO$_2$/TiO$_2$ film having a thickness of 100/280/170 nm was formed were used Each of these samples had a structure as shown in FIG. 3A. As a comparative example (Comparative Example 1), an Au film 50 nm thick was formed in a perpendicular direction. The optical characteristics of these diffraction optical element samples were evaluated. Results of the evaluation were shown in Table 3.

TABLE 3

| Sample | Kind of film | S polarization diffraction efficiency (%) | P polarization diffraction efficiency (%) |
| --- | --- | --- | --- |
| 3-1 | Al/SiO$_2$ | 58 | 62 |
| 3-2 | Al/SiO$_2$/TiO$_2$ | 76 | 75 |
| Comparative Example 1 | Au | 91 | 39 |

As was obvious from Table 3, the S polarization diffraction efficiency of the diffraction optical element having only the Au film formed according to Comparative Example 1 was higher than twice as high as the P polarization diffraction efficiency thereof On the other hand, when the thickness of the dielectric film was selected to be equal to about ¼ as large as the measurement wavelength of 1550 nm (in conversion into optical length), diffraction efficiency in S polarization could be made substantially equal to diffraction efficiency in P polarization. Furthermore, when the configuration of the dielectric film was changed so that TiO$_2$ high in refractive index was provided as a front surface, diffraction efficiency could be increased by 10% or more.

When the dielectric film (grating shape adjusting layer) having a thickness selected to be equal to about $\lambda/4$ in which $\lambda$ was the wavelength of each incident beam was formed on a metal film (reflecting film) in the condition that the position of the evaporation source at the time of film formation was set in the same direction as the direction of incidence at the time of evaluation of optical characteristic, the difference between diffraction efficiency in S polarization and diffraction efficiency in P polarization could be reduced remarkably compared with the film-forming structure of a conventional metal monolayer film. This result was coincident in tendency with a result of electromagnetic wave analysis using a finite-element method.

Example 4

An Al film was formed on an element body made of an epoxy resin. In the condition that the element body was inclined at 45° to a sputter target, an SiO$_2$ film 280 nm thick was formed on the Al film of the element body. The optical characteristic of the sample produced thus was evaluated. For comparison, optical characteristic in the case where only the Al film was formed was evaluated. Results of the evaluation were shown in Table 4.

TABLE 4

| Sample | Kind of film | S polarization diffraction efficiency (%) | P polarization diffraction efficiency (%) |
| --- | --- | --- | --- |
| 4-1 | Only Al | 90 | 32 |
| 4-2 | Al/SiO$_2$ | 64 | 54 |

It became obvious from the results that the diffraction efficiency difference according to the state of polarization could be suppressed even in the diffraction optical element made of another material than sol-gel glass, that is, regardless of the material of the element body. Incidentally, because a sputtering method was used in consideration of heat resistance of the epoxy resin, directivity was so low that the efficiency difference suppressing effect in this case was inferior to that in the case of vapor deposition.

Comparative Example 2

A film of Al/Cr/Au (100 nm/10 nm/10 nm) was formed on a mold surface of a transfer mold body made of an epoxy resin. A sol liquid containing an aqueous solution of methyltriethoxysilane and acid as a main component was applied on a glass substrate to thereby obtain a gel film. The transfer mold was pressed against the gel film in a vacuum in the condition that the gel film was soft yet. Then, the gel film was kept at about 60° C. so as to be hardened. Then, the transfer mold was released from the gel film in the condition that the internal pressure of a press molding apparatus was returned to atmospheric pressure. Then, the gel film was heated to produce a diffraction optical element. An Au film uniform in thickness was perpendicularly formed as a reflecting film on the diffraction optical element. The optical characteristic of the thus obtained diffraction optical element was evaluated.

Example 5

Figure 7A:
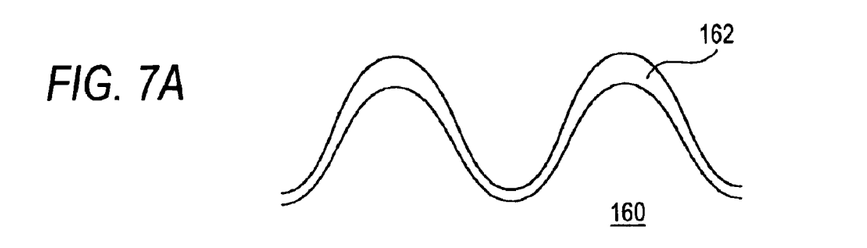
FIGS. 7A to 7D are enlarged explanatory views showing further examples of the transfer mold according to the invention.
Figure 7B:
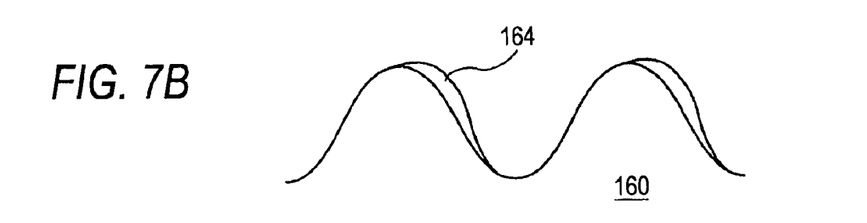
Figure 7C:
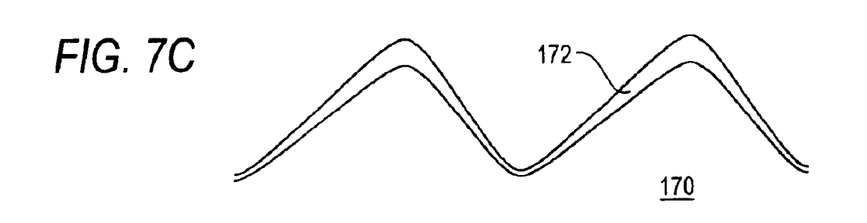
Figure 7D:
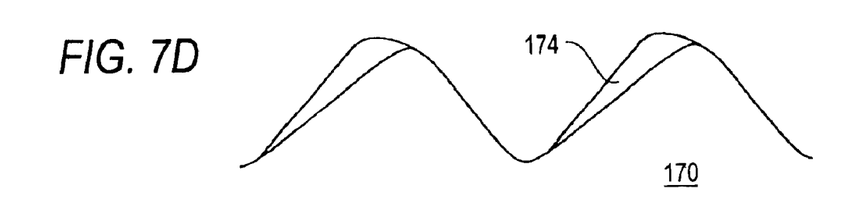

The transfer mold was used as a mold body. A groove shape adjusting layer was formed on the mold body by a sputtering method to prepare a transfer mold. In this case, the groove shape adjusting layer served also as a mold-release film because Au was used as the material of the groove shape adjusting layer. In the film formation by the sputtering method, material particles were apt to be deposited on a neighbor of a front end of each convex portion. Accordingly, a sectional shape was obtained so that each groove was deepened as shown in FIG. 7A. The thickness or the groove shape adjusting layer was 70 nm at a peak portion of each convex portion. This transfer mold was used for transfer-molding a diffraction optical element from the gel film in the same manner as in Comparative Example 2. An Au film uniform in thickness was perpendicularly formed as a reflecting film on the thus produced diffraction optical element. The optical characteristic of the resulting diffraction optical element was evaluated. The evaluated result of the optical characteristic was shown in Table 5. Incidentally, PDL was polarization-dependent loss for indicating a diffraction efficiency difference according to the state of polarization.

TABLE 5

| Sample | TM polarization diffraction efficiency | TE polarization diffraction efficiency | PDL |
| --- | --- | --- | --- |
| Comparative Example 2 | 61% | 33% | 2.6 dB |
| Example 5 | 53% | 46% | 0.7 dB |

It is obvious from this result that polarizing characteristic in diffraction efficiency varies between Comparative Example 2 and Example 5 according to the invention. This is because the groove shape varies according to the groove shape adjusting layer deposited on the mold body and the grating shape of the diffraction optical element as the transfer-molded product varies according to the variation in the groove shape to thereby control polarizing characteristic in diffraction efficiency.

Use of a conventional transfer mold is effective in transfer-molding a diffraction optical element for such a purpose that efficiency only in TM polarization in regarded as important. Particularly in the field of optical communication, low PDL characteristic is however often required. This is because input light polarization control or the like is required in the case or high PDL to thereby frequently cause a disadvantage in increase in the number of parts. In such a case, the diffraction optical element transfer-molded by use of the transfer mold according to the invention is very advantageous.

As is obvious from the above description, one kind of the mold body can be used for various purposes by control of the groove shape adjusting layer. Examples of selection required for obtaining a specific groove shape include selection of the film-forming method (a vapor deposition method or a sputtering method), selection of the film-forming condition (back gas pressure, temperature, input energy, film-forming direction, film material, etc.), selection of the surface shape of the transfer mold body, and selection of material.

As described above, the invention provides a diffraction optical element including an element body, and a grating shape adjusting layer deposited on a grating surface of the element body by oblique incidence of material particles onto the grating surface. Accordingly, the groove shape of the element body can be corrected by the grating shape adjusting layer or the groove depth can be made larger by the grating shape adjusting layer, so that desired optical characteristic can be exhibited.

Furthermore, when the material and thickness of the grating shape adjusting layer deposited an the grating surface of the element body are controlled, the optical shape can be changed or the optical characteristic (polarization or reflectance) can be adjusted to a desired value. For example, diffraction efficiency in S polarization can be made substantially equal to diffraction efficiency in P polarization, so that optical characteristic independent of the state of polarization can be exhibited.

Although the embodiment has shown the case where the groove shape adjusting layer serves also as a mold-release film, the invention may be also applied to the configuration where a mold-release film made of a precious metal such as Au or Pt is formed on a groove shape adjusting layer using metal such as Cr or Ti or oxide such as $Ta_2O_3$.

As described above, the invention provides a transfer mold for molding a diffraction optical element, which has a groove shape adjusting layer deposited on a mold surface of a mold body by incidence of material particles or has an additionally processed surface formed by directional etching. Accordingly, even in the case where shape failure is found in the mold body, the groove shape can be corrected suitably so that a mold surface having a desired shape can be obtained easily and in a short term. In addition, even in the case where the same mold body is used without being exchanged, the groove shape of the mold body can be corrected suitably so that various kinds of diffraction optical elements having desired optical performance can be obtained easily.

What is claimed is:

1. A diffraction optical element comprising:
   an element body having a large number of grooves formed on a surface thereof at regular intervals to form a grating,
   a grating shape adjusting layer deposited on said element body by oblique incidence of material particles, and
   a reflecting film formed on said grating shape adjusting layer, wherein a contour shape of a grating surface in a section perpendicular to a lengthwise direction of said grooves has a periodic shape which is not similar to a sectional shape of said element body.

2. A diffraction optical element according to claim 1, further comprising a transparent dielectric layer provided on said reflecting film.

3. A diffraction optical element according to claim 1, wherein said element body includes a sol-gel glass composition having a large number of grooves formed on a surface thereof by transfer molding.

4. A diffraction optical element comprising:
   an element body having a large number of grooves formed on a surface thereof at regular intervals to form a grating;
   a reflecting film formed on said surface of said element body; and
   a grating shape adjusting layer deposited on said reflecting film by oblique incidence of material particles onto said reflecting film so as to form a grating surface,
   wherein a contour shape of a grating surface in a section perpendicular to a lengthwise direction of said grooves is not similar to a sectional shape of said element body.

5. A diffraction optical element according to claim 4, wherein said grating shape adjusting layer is made of a transparent dielectric material.

6. A diffraction optical element according to claim 4, wherein further comprising a transparent dielectric layer provided on said grating shape adjusting layer.

7. A diffraction optical element according to claim 4, wherein said element body includes a sol-gel glass composition having a large number of grooves formed on a surface thereof by transfer molding.

8. A transfer mold, comprising:
   a mold body for molding a diffraction optical element having a large number of grooves fanned on a surface thereof at regular intervals, and
   a groove shape adjusting layer deposited on said surface of said mold body by incidence of material particles onto said mold surface;
   wherein a contour shape of a molding surface in a section perpendicular to a lengthwise direction of said grooves has a periodic shape which is not similar to a sectional shape of said mold body.

9. A transfer mold according to claim 8, wherein said groove shape adjusting layer is made of a mold-release film material.

10. A transfer mold according to claim 8, further comprising a mold-release film formed on said groove shape adjusting layer.

11. A transfer mold according to claim 8, wherein said groove shape adjusting layer is deposited on said surface of said mold body by oblique incidence of said material particles onto said mold surface.

12. A transfer mold, comprising:
    a mold body for molding a diffraction optical element having a large number of grooves formed on a surface thereof at regular intervals and having an additionally processed surface formed by directional etching of said surface of said mold body; and
    a mold-release film formed on said additionally processed surface;
    wherein a contour shape of a molding surface in a section perpendicular to a lengthwise direction of said grooves is corrected to be not similar to an original sectional shape of said mold body.

13. A diffraction optical element comprising:
    an element body having a large number of grooves formed on a surface thereof at regular intervals to form a grating, and
    a grating shape adjusting layer deposited on said element body by oblique incidence of material particles,
    wherein a contour shape of a grating surface in a section perpendicular to a lengthwise direction of said grooves has a periodic shape which is not similar to a sectional shape of said element body,
    each of said grooves of said element body has a symmetrical groove shape and
    said groove shape becomes asymmetrical by said groove shape adjusting layer.

14. A transfer mold for molding a diffraction optical element, comprising:
    a mold body having a large number of grooves formed on a surface thereof at regular intervals, and
    a groove shape adjusting layer deposited on said surface of said mold body by incidence of material particles onto said mold surface;
    wherein a contour shape of a molding surface in a section perpendicular to a lengthwise direction of said grooves has a periodic shape which is not similar to a sectional shape of said mold body,
    each of said grooves of said mold body has a symmetrical groove shape and
    said groove shape becomes asymmetrical by said groove shape adjusting layer.

* * * * *